March 12, 1940.     M. Y. SEATON     2,193,569
METHOD OF AND APPARATUS FOR DRYING
Filed Oct. 14, 1936
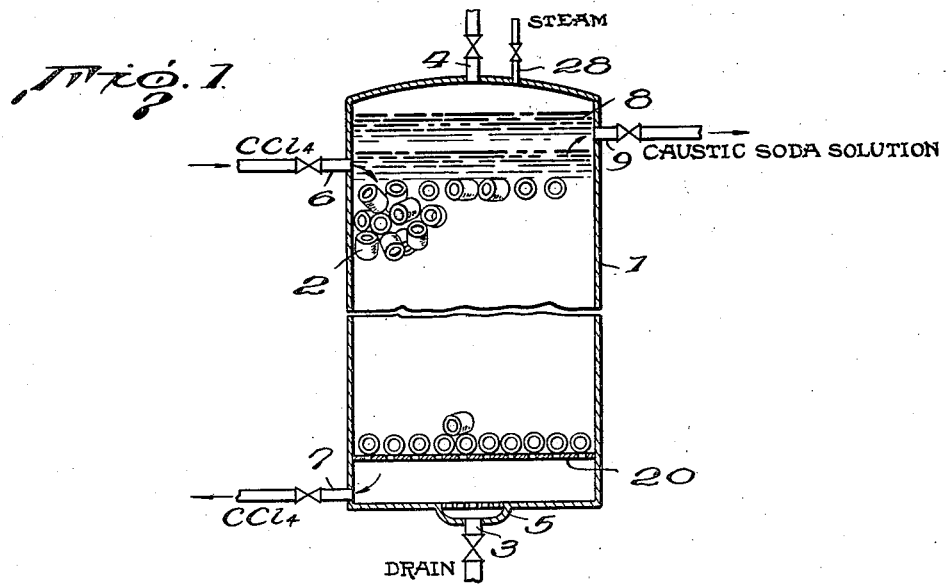
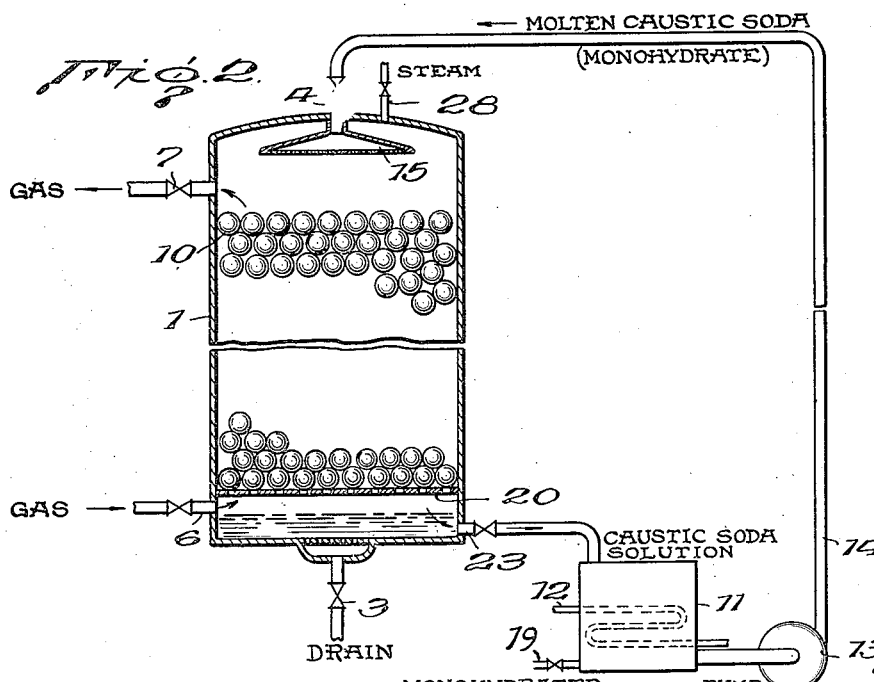
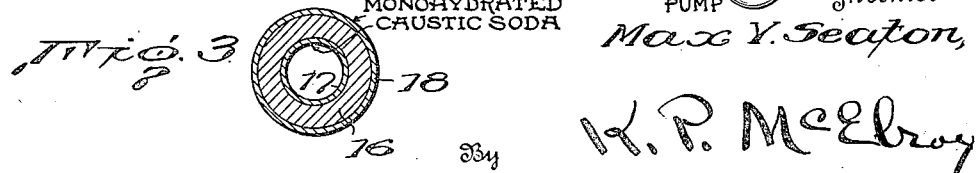

Patented Mar. 12, 1940

2,193,569

UNITED STATES PATENT OFFICE 2,193,569

METHOD OF AND APPARATUS FOR DRYING

Max Y. Seaton, Greenwich, Conn., assignor, by mesne assignments, to Westvaco Chlorine Products Corporation, New York, N. Y., a corporation of Delaware Application October 14, 1936, Serial No. 105,576

8 Claims. (Cl. 260—704)

This invention relates to methods of and apparatus for drying; and it comprises a method of drying gases and liquids by contact with supported films of solid monohydrated caustic soda carried on extensive smooth surfaces of a packing material, such as Raschig's rings, in a tube or tower, with removal of soda liquefied by the water taken up, the films being provided by melting 70 per cent caustic, flowing it over said surfaces and allowing it to solidify in place; and it further comprises a tubular container having inlets and outlets for gases or liquids to be dried and a packing of smooth surfaced articles carrying solid films of monohydrated caustic soda, means being provided for removal of liquid caustic soda as it forms; all as more fully hereinafter set forth and as claimed.

Caustic soda, NaOH, is an excellent drying agent in the sense that it will withdraw water quite completely from air or gases in contact therewith; withdrawal being to an extremely low residual partial pressure of $H_2O$ vapor. It is however difficult to utilize it as a drying agent for air or gases in any practical way. Efficient drying of a flowing current of gas by any drying agent requires presentation to the flow of extensive areas of active surface and if the partial pressure of $H_2O$ vapor is to reach a minimum these surfaces must be kept active by removal of moist products. Commercial forms of solid NaOH, stick, flake and granulated, do not lend themselves well to drying operations. They tend to cake, reducing the permeability to gas flow. Solutions of caustic soda have a relatively high vapor tension increasing with the water pick-up and are not efficient for exhaustive drying.

Commercial solid caustic soda, as NaOH, is not particularly active as a water absorbent in the sense of being quick acting. It takes up water comparatively slowly even on a fresh surface and in practice clean surfaces of NaOH soon clog with liquid products.

As I have found, however, solid monohydrated caustic ($NaOH.H_2O$) is quick acting and its drying efficiency is practically as great as that of anhydrous NaOH; it reduces the partial pressure of $H_2O$ in gases to practically the same low point giving as exhausting drying. And it has the great practical advantage that used in solid form as hereinafter described, the active surfaces are, so to speak, self-cleaning; the water taken up drips or drains off as a mobile soda solution of maximum concentration and minimum vapor tension.

What is known as 70 per cent caustic is substantially monohydrate and is useful for the present purposes. It is solid material, melting at about 65° C. It is commercially available in molten or semi-molten form; being for example shipped in tank cars provided with heating coils to permit melting and pumping.

Carrier supported solid films of 70 per cent caustic are used in the present invention for drying air and gases and unreactive liquids, such as carbon tetrachloride and hydrocarbons. Drying is at temperatures below 65° C. The carrier surfaces are filmed or coated with molten monohydrate which is cooled and solidified in place. Smooth, non-porous carriers are best. What are known as Raschig's rings, made of various materials, are particularly suitable, but carriers of porcelain, metal, etc., may be employed. The coated carriers are placed in a vertical tube or tower and the material to be treated is passed through the tower in contact with extensive surfaces of the solidified caustic. As the caustic takes up water and liquefies, the liquid drains off and is suitably collected. Fresh surfaces of solid caustic are constantly available until all the caustic is used up.

The described process is particularly useful in removing the last traces of water from carbon tetrachloride, carbon tetrachloride being passed downwardly through a tower containing the coated rings as a slow current. Liquefied soda, being somewhat lighter than carbon tetrachloride, goes upwardly and is separately collected. In drying light liquids, such as gasoline and petroleum oils, the direction of flow of liquid through the tower is generally upward.

The filmed monohydrate is of general utility in drying gases exhaustively, the gas in this case being passed through the tower and the liquefied product collected at the bottom.

Drying gases in this way is convenient in a number of relations, among them in processes of conditioning air.

The solid layers or films of monohydrate on a carrier gradually disappear as water is taken up and they must be renewed from time to time. Sometimes, prior to renewing, I steam and dry the carriers. Replenishment may be by flowing molten 70 per cent caustic down through the tower or tube and over the carrying elements. In small scale units, it is convenient to fill the tube with molten monohydrate and allow the excess to drain off.

In the present invention, the solid monohydrate is used as supported films exposing a large surface to passing gases, vapors or liquids and conditions are so arranged that liquefied product formed by water taken up, can drain off, giving a renewed solid surface. Porous carriers, like coke, are not so well adapted, because of liquid trapping, as smooth surfaced carriers, such as metal, glass, porcelain, etc. With a porous material, at the end of the period of activity, spent alkali will be held in the pores and is difficult of removal. There is, moreover, with any such porous carrier a presentation to the gas, not only of monohydrate with its minimal vapor tension but of hydrated liquids with a considerable vapor tension; the net drying effect is less. With monohydrate filmed on a smooth carrier, hydrated liquid drains off at once.

In drying air by the present invention, $CO_2$ is also removed but this does not complicate the described operation. The amount of $CO_2$ in ordinary air is very little as compared with the moisture content.

Because of the extremely efficient removal of moisture by monohydrated caustic soda, it is sometimes expedient to use a desiccator under the present invention as a last unit in series with other drying means to complete the dehydration. Or it may be used as an intermediate unit in special cases.

Liquid caustic soda solution draining out of a desiccator can be reconcentrated to 70 per cent caustic, ready for re-use, or otherwise regenerated in a variety of ways. It is possible to add ordinary anhydrous caustic soda to bring the liquid back to the 70 per cent strength.

In one particular installation the caustic soda is kept in, so to speak, cyclic circulation, the drippings from the rings being heated above 65° C., strengthened by adding flaky anhydrous caustic and sent back for circulation through the tower. When the amount of caustic soda in circulation becomes too great, a portion is removed from the system. Removing a portion of the caustic in this way is convenient where, as in drying air, a content of $CO_2$ tends to build up in the system. As a rule, the spent caustic draining from a drying tower has a concentration somewhere between 30 and 45 per cent and requires a corresponding addition of anhydrous soda to bring it back to the 70 per cent strength.

While I have spoken more particularly of the commercial grade, 70 per cent caustic soda, the invention is not limited to this strength. A 75 or even an 80 per cent caustic soda contains a considerable amount of monohydrate, is readily fusible and can be solidified into carrier supported films in the same way.

It has been found that filmed monohydrate will reduce the partial pressure of $H_2O$ in gases further than is possible with calcium chloride and most of the other ordinary drying agents.

In the accompanying illustration I have shown, more or less diagrammatically, certain apparatus within the purview of the present invention and capable of use in carrying out the described process. In this showing Fig. 1 is a view in vertical section of a unit employed in drying a liquid, such as carbon tetrachlorid and having a packing of filmed Raschig's rings;

Fig. 2 is a similar view of a unit as employed for drying gas and having a packing of filmed balls and Fig. 3 is a detailed view in section of a Raschig's ring carrying a solidified film of monohydrated caustic soda.

In the showing of Fig. 1 element 1 is a cylindrical casing carrying a packing of the well known Raschig's rings 2 supported on a perforated false bottom 20. At the bottom the casing is provided with drain 3 and at the top with filling inlet 4. The bottom outlet communicates with a sort of sump 5. As shown, heavy liquid enters through upper inlet 6 and passes downward through and past the assemblage of Raschig's rings to outlet 7. Liquid caustic soda as it is formed from the solid soda on the rings passes upward and forms a supernatant pool 8 tapped from time to time through outlet 9. When the activity of the unit is exhausted liquid is drained out of it and the assemblage of rings steamed using steam inlet 28. Drainage is taken away at the base. In replenishing, if the unit be small the clean and dry chamber is simply filled with molten 70 per cent caustic soda through inlet 4 and the excess drained away through outlet 3.

When this particular unit is used for drying gasoline or like liquids, the liquid now enters through the bottom connection 7 and departs through the upper connection 6. Liquefied caustic soda accumulates in sump 5 and is drained off through 3.

The showing in Fig. 2 is much the same, similar elements having similar reference numerals and operating in the same manner. Instead of Raschig's rings, however, the packing is balls 10 which may be metal, glass or any other material, having a smooth surface and resistant to soda. Gas enters through the lower inlet (6) and departs through upper outlet (7). The figure also shows collateral apparatus to be used in replenishing the solid film from time to time. As shown, liquefied caustic soda draining out at 23 goes to an open-topped storage tank 11 provided with heating coils 12. From time to time when the solid film on the packing material is exhausted, and usually after a steaming and cleaning operation, the accumulation of hot liquid caustic soda in 11 is fortified by an addition of flaked caustic soda and is sent back by pump 13 and line 14 for filming the packing material. Used in this way inlet 4 may be provided with a distributor 15. As before, the whole apparatus may be filled with molten soda and the excess drained off to storage 11. From time to time caustic soda liquor is purged off by a valved outlet 19.

In the showing of Fig. 3, which is a cross section of a filmed Raschig's ring, 16 is vitreous material or metal while films 17 and 18 are solidified molten caustic soda.

Caustic potash may be used in the present invention in lieu of caustic soda, although it is not as efficient, pound for pound, because of the higher molecular weight. In using it a caustic potash liquor is brought to such a concentration that it will set on cooling and remain solid up to 60°–80° C., melting again at higher temperature. Mixtures of KOH and NaOH hydrates have interesting properties in this connection since for equivalent melting points, dehydration can be carried further and a lower vapor tension obtained while still making a material solid at 60°–80° C.

What I claim is:

1. In drying $H_2O$-containing fluids which are substantially inert chemically to caustic soda, the process which comprises passing a current of said fluid in contact with solid films of hydrated caustic soda containing 70 to 80 per cent NaOH and 30 to 20 per cent combined water, supported on a substantially impervious base and arranged for free drainage whereby the surface of the solid films liquefies upon taking up moisture from the fluid, and removing the liquefied caustic soda as it is formed, by gravital action, to expose fresh surfaces of solid caustic soda to the fluid.

2. The process of claim 1 wherein the caustic soda is 70 per cent caustic soda.

3. The process of claim 1 wherein the films contain monohydrated sodium hydroxide, NaOH.H₂O.

4. The process of claim 1 wherein the fluid is a gas, and the liquefied caustic soda formed flows downwardly.

5. The process of claim 1 wherein the fluid is carbon tetrachloride, and the liquefied caustic soda formed is displaced upwardly by the heavier tetrachloride.

6. The process of claim 1 wherein the supported film is carried on smooth surfaced articles of large area in vertical arrangement.

7. A drying apparatus to be used in drying at temperatures below 65° C. comprising a packed casing having inlets and outlets for fluids to be dried and means for disposing of spent liquid drying agent, the packing being smooth surfaced articles exposing a large area to passing fluids and provided with a covering layer of solid monohydrated caustic soda.

8. A process of drying wet fluids which are substantially inert chemically to caustic soda, which comprises passing a current of said fluid in contact with solid films of hydrated caustic alkali containing water in amount such that the melting point of the hydrated caustic alkali is 60 to 80° C., said films being supported on a system of substantially impervious supporting bodies arranged for free drainage of liquid, whereby the surface of the solid films liquefies upon taking up moisture from the fluid, removing the liquefied caustic as it is formed, to expose fresh surfaces of solid caustic to the fluid, and regenerating the system from time to time by flowing over and solidifying on the supporting bodies molten hydrated caustic alkali containing enough water to give it a melting point of 60° to 80° C., so that the hydrated alkali remains as films on the supporting bodies at lower temperatures.

MAX Y. SEATON.